(12) United States Patent
Kim et al.

(10) Patent No.: US 9,106,379 B2
(45) Date of Patent: *Aug. 11, 2015

(54) METHOD FOR TRANSMITTING CONTROL SIGNAL USING EFFICIENT MULTIPLEXING

(75) Inventors: Hak Seong Kim, Gyeonggi-do (KR); Sung Duk Choi, Gyeonggi-do (KR); Ki Jun Kim, Gyeonggi-do (KR); Suk Hyon Yoon, Gyeonggi-do (KR); Joon Kui Ahn, Gyeonggi-do (KR); Bong Hoe Kim, Gyeonggi-do (KR); Dong Youn Seo, Gyeonggi-do (KR); Young Woo Yun, Gyeonggi-do (KR); Jung Hoon Lee, Gyeonggi-do (KR); Seong Hoon Jeong, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/014,665

(22) Filed: Jan. 26, 2011

(65) Prior Publication Data

US 2011/0149901 A1   Jun. 23, 2011

Related U.S. Application Data

(63) Continuation of application No. 12/608,213, filed on Oct. 29, 2009, now Pat. No. 7,995,553, which is a continuation of application No. 12/444,100, filed as application No. PCT/KR2007/004825 on Oct. 2, 2007, now Pat. No. 7,953,061.

(60) Provisional application No. 60/827,852, filed on Oct. 2, 2006, provisional application No. 60/955,019, filed on Aug. 9, 2007.

(30) Foreign Application Priority Data

Feb. 5, 2007   (KR) .................. 10-2007-0011533
Oct. 2, 2007   (KR) .................. 10-2007-0099055

(51) Int. Cl.
*H04W 72/04* (2009.01)
*H04L 5/00* (2006.01)
(Continued)

(52) U.S. Cl.
CPC ............ *H04L 5/0053* (2013.01); *H04L 1/1607* (2013.01); *H04L 1/1854* (2013.01); *H04L 1/1858* (2013.01); *H04L 1/1861* (2013.01); *H04L 5/0055* (2013.01); *H04L 5/0026* (2013.01)

(58) Field of Classification Search
USPC .......................................... 370/330, 335, 342
See application file for complete search history.

(56) References Cited

U.S. PATENT DOCUMENTS 5,870,391 A   2/1999 Nago
6,452,936 B1   9/2002 Shiino
(Continued)

FOREIGN PATENT DOCUMENTS

CN   1256033   6/2000
CN   1567761   1/2005
(Continued)

OTHER PUBLICATIONS

NTT DoCoMo et al., "Coding Scheme of L1/L2 Control Channel for E-UTRA Downlink", R1-061672, 3GPP TSG RAN WG1 LTE Ad Hoc, Jun. 2006.

(Continued)

*Primary Examiner* — Brandon Renner
*Assistant Examiner* — Scott M Sciacca
(74) *Attorney, Agent, or Firm* — Lee, Hong, Degerman, Kang & Waimey

(57) ABSTRACT

A method of transmitting a control signal using efficient multiplexing is disclosed. The present invention includes the steps of multiplexing a plurality of 1-bit control signals within a prescribed time-frequency domain by code division multiple access (CDMA) and transmitting the multiplexed control signals, wherein a plurality of the 1-hit control signals include a plurality of the 1-bit control signals for a specific transmitting side. Accordingly, reliability on 1-bit control signal transmission can be enhanced.

14 Claims, 9 Drawing Sheets

(51) Int. Cl.
 *H04L 1/16* (2006.01)
 *H04L 1/18* (2006.01)

(56) References Cited

U.S. PATENT DOCUMENTS

| | | | |
|---|---|---|---|
| 6,842,487 | B1 | 1/2005 | Larsson |
| 6,934,318 | B2 | 8/2005 | Sarkar |
| 7,069,050 | B2 | 6/2006 | Yoshida |
| 7,315,577 | B2 | 1/2008 | Shao |
| 7,336,633 | B2 | 2/2008 | Kruys |
| 7,386,076 | B2 | 6/2008 | Onggosanusi et al. |
| 7,953,169 | B2 | 5/2011 | Lee et al. |
| 7,954,032 | B2 | 5/2011 | Kim et al. |
| 7,995,661 | B2 | 8/2011 | Xu et al. |
| 8,369,378 | B2 | 2/2013 | Lee et al. |
| 8,774,297 | B2 | 7/2014 | Lee et al. |
| 8,774,299 | B2 | 7/2014 | Lee et al. |
| 8,792,570 | B2 | 7/2014 | Lee et al. |
| 2001/0005681 | A1 | 6/2001 | Kim |
| 2001/0034236 | A1 | 10/2001 | Tong et al. |
| 2003/0039227 | A1 | 2/2003 | Kwak |
| 2003/0133426 | A1 | 7/2003 | Schein et al. |
| 2004/0009780 | A1 | 1/2004 | Dick et al. |
| 2004/0081131 | A1 | 4/2004 | Walton et al. |
| 2004/0100896 | A1 | 5/2004 | Vayanos et al. |
| 2004/0190640 | A1 | 9/2004 | Dubuc et al. |
| 2005/0083977 | A1 | 4/2005 | Moulsley et al. |
| 2005/0117536 | A1 | 6/2005 | Cho et al. |
| 2005/0122898 | A1* | 6/2005 | Jang et al. .............. 370/218 |
| 2005/0165949 | A1 | 7/2005 | Teague |
| 2005/0220000 | A1 | 10/2005 | Kim et al. |
| 2005/0232181 | A1 | 10/2005 | Park et al. |
| 2005/0233754 | A1 | 10/2005 | Beale |
| 2005/0286402 | A1* | 12/2005 | Byun et al. .............. 370/203 |
| 2006/0013186 | A1* | 1/2006 | Agrawal et al. .............. 370/344 |
| 2006/0045001 | A1 | 3/2006 | Jalali |
| 2006/0171295 | A1* | 8/2006 | Ihm et al. .............. 370/208 |
| 2006/0198294 | A1 | 9/2006 | Gerlach |
| 2006/0209814 | A1 | 9/2006 | Fujii |
| 2006/0250941 | A1 | 11/2006 | Onggosanusi et al. |
| 2006/0264218 | A1 | 11/2006 | Zhang et al. |
| 2006/0274842 | A1 | 12/2006 | Pan et al. |
| 2006/0280256 | A1* | 12/2006 | Kwon et al. .............. 375/260 |
| 2007/0064669 | A1* | 3/2007 | Classon et al. .............. 370/347 |
| 2007/0097915 | A1 | 5/2007 | Papasakellariou |
| 2007/0097942 | A1* | 5/2007 | Gorokhov et al. .............. 370/342 |
| 2007/0097981 | A1* | 5/2007 | Papasakellariou .............. 370/394 |
| 2007/0110104 | A1 | 5/2007 | Sartori et al. |
| 2007/0149137 | A1 | 6/2007 | Richardson et al. |
| 2007/0183533 | A1 | 8/2007 | Schmidl et al. |
| 2007/0184849 | A1 | 8/2007 | Zheng |
| 2007/0206559 | A1 | 9/2007 | Cho et al. |
| 2007/0208986 | A1 | 9/2007 | Luo et al. |
| 2007/0211667 | A1* | 9/2007 | Agrawal et al. .............. 370/335 |
| 2007/0254662 | A1* | 11/2007 | Khan et al. .............. 455/436 |
| 2007/0258373 | A1 | 11/2007 | Frederiksen et al. |
| 2007/0258540 | A1* | 11/2007 | Ratasuk et al. .............. 375/267 |
| 2008/0025247 | A1 | 1/2008 | McBeath et al. |
| 2008/0025337 | A1 | 1/2008 | Smith et al. |
| 2008/0075184 | A1* | 3/2008 | Muharemovic et al. .............. 375/260 |
| 2008/0090528 | A1* | 4/2008 | Malladi .............. 455/70 |
| 2008/0095106 | A1* | 4/2008 | Malladi et al. .............. 370/329 |
| 2008/0151829 | A1 | 6/2008 | Khandekar et al. |
| 2008/0205348 | A1 | 8/2008 | Malladi |
| 2008/0225784 | A1 | 9/2008 | Tseng |
| 2008/0225791 | A1 | 9/2008 | Pi et al. |
| 2008/0227398 | A1 | 9/2008 | Haghighat et al. |
| 2008/0232307 | A1 | 9/2008 | Pi et al. |
| 2008/0253469 | A1 | 10/2008 | Ma et al. |
| 2008/0267158 | A1* | 10/2008 | Zhang et al. .............. 370/342 |
| 2008/0267310 | A1 | 10/2008 | Khan et al. |
| 2008/0304593 | A1 | 12/2008 | Khan et al. |
| 2008/0310483 | A1 | 12/2008 | Lee et al. |
| 2009/0046793 | A1 | 2/2009 | Love et al. |
| 2009/0059884 | A1 | 3/2009 | Zhang et al. |
| 2009/0060081 | A1 | 3/2009 | Zhang et al. |
| 2009/0154580 | A1 | 6/2009 | Ahn et al. |
| 2009/0196279 | A1 | 8/2009 | Kim et al. |
| 2009/0262699 | A1 | 10/2009 | Wengerter et al. |
| 2009/0274037 | A1 | 11/2009 | Lee et al. |
| 2009/0285163 | A1 | 11/2009 | Zhang et al. |
| 2009/0310719 | A1 | 12/2009 | Stirling-gallacher |
| 2009/0323615 | A1 | 12/2009 | Ihm et al. |
| 2010/0034163 | A1 | 2/2010 | Damnjanovic et al. |
| 2010/0098005 | A1 | 4/2010 | Lee et al. |
| 2010/0111031 | A1 | 5/2010 | Kim et al. |
| 2010/0260164 | A1 | 10/2010 | Moon et al. |
| 2011/0002309 | A1 | 1/2011 | Park et al. |
| 2012/0106478 | A1 | 5/2012 | Han et al. |
| 2012/0113945 | A1 | 5/2012 | Moon et al. |
| 2013/0294282 | A1 | 11/2013 | Seo |

FOREIGN PATENT DOCUMENTS

| | | |
|---|---|---|
| CN | 1701550 | 11/2005 |
| CN | 1829373 | 9/2006 |
| CN | 1969522 | 5/2007 |
| CN | 101005326 | 7/2007 |
| EP | 1185001 | 3/2002 |
| EP | 1248485 | 10/2002 |
| EP | 1448012 | 8/2004 |
| EP | 1746810 | 1/2007 |
| EP | 1746855 | 1/2007 |
| JP | 04-074026 | 3/1992 |
| JP | 2001044900 | 2/2001 |
| JP | 2002369258 | 12/2002 |
| JP | 2004-312291 | 11/2004 |
| JP | 2004364321 | 12/2004 |
| JP | 2005244960 | 9/2005 |
| JP | 2005253073 | 9/2005 |
| JP | 2005288300 | 10/2005 |
| JP | 2006166382 | 6/2006 |
| JP | 2007-124682 | 5/2007 |
| JP | 2007-511975 | 5/2007 |
| JP | 2007-221755 | 8/2007 |
| JP | 2008-053858 | 3/2008 |
| JP | 2008-092377 | 4/2008 |
| JP | 2008092051 | 4/2008 |
| JP | 2008236018 | 10/2008 |
| JP | 2010506505 | 2/2010 |
| JP | 2011193521 | 9/2011 |
| KR | 101999013366 | 2/1999 |
| KR | 10-2002-0009079 | 2/2002 |
| KR | 1020020088085 | 11/2002 |
| KR | 1020030081464 | 10/2003 |
| KR | 1020050021965 | 3/2005 |
| KR | 10-2005-0043302 | 5/2005 |
| KR | 1020050073256 | 7/2005 |
| KR | 10-2005-0120244 | 12/2005 |
| KR | 1020060016600 | 2/2006 |
| KR | 10-2006-0081352 | 7/2006 |
| KR | 10-2006-0092055 | 8/2006 |
| KR | 1020060095576 | 8/2006 |
| KR | 1020070107614 | 11/2007 |
| KR | 10-2008-0023664 | 3/2008 |
| KR | 1020080023664 | 3/2008 |
| KR | 1020080030905 | 4/2008 |
| KR | 1020080039772 | 5/2008 |
| KR | 10-2008-0065853 | 7/2008 |
| KR | 1020080065853 | 7/2008 |
| KR | 10-2008-0096088 | 10/2008 |
| KR | 1020080096088 | 10/2008 |
| KR | 10-0894142 | 4/2009 |
| KR | 100894142 | 4/2009 |
| KR | 10-2009-0082843 | 7/2009 |
| KR | 1020090082843 | 7/2009 |
| RU | 2142672 | 10/1999 |
| RU | 2221335 | 1/2004 |
| RU | 2267225 | 5/2005 |
| TW | 545074 | 8/2003 |
| WO | 03/043245 | 5/2003 |
| WO | 03/077579 | 9/2003 |
| WO | 03/085858 | 10/2003 |
| WO | 2004/038991 | 5/2004 |

(56) References Cited

FOREIGN PATENT DOCUMENTS

| | | |
|---|---|---|
| WO | 2004/049591 | 6/2004 |
| WO | 2005/006250 | 1/2005 |
| WO | 2005/050875 | 6/2005 |
| WO | 2005/060132 | 6/2005 |
| WO | 2005/065062 | 7/2005 |
| WO | 2005/074184 | 8/2005 |
| WO | 2005/088869 | 9/2005 |
| WO | 2005/099123 | 10/2005 |
| WO | 2005/125140 | 12/2005 |
| WO | 2005119959 | 12/2005 |
| WO | 2006/023192 | 3/2006 |
| WO | 2006/069299 | 6/2006 |
| WO | 2006/071050 | 7/2006 |
| WO | 2006/073284 | 7/2006 |
| WO | 2006/102771 | 10/2006 |
| WO | 2007/011180 | 1/2007 |
| WO | 2007007380 | 1/2007 |
| WO | 2007/052941 | 5/2007 |
| WO | 2007049208 | 5/2007 |
| WO | 2007/078146 | 7/2007 |
| WO | 2007/091836 | 8/2007 |
| WO | 2008041819 | 4/2008 |
| WO | 2008/133439 | 11/2008 |
| WO | 2008/153331 | 12/2008 |
| WO | 2009/041785 | 4/2009 |

OTHER PUBLICATIONS

Sharp, "UE Identity in L1/L2 Downlink Control Signalling", R1-061136, 3GPP TSG-RAN WG1#45, May 2006.
LG Electronics, "Downlink control signaling", R1-063177, 3GPP TSG RAN WG1 #47, Nov. 2006.
LG Electronics, "DL ACK/NACK structure", R1-072878, 3GPP TSG RAN WG1 #49bis, Jun. 2007.
LG Electronics, "Downlink resource allocation for localized and distributed transmission," R1-071549, 3GPP TSG RAN WG1 #48bis, Mar. 2007, XP-050105480.
Huawei, "E-UTRA Downlink L1/L2 Control Channel Structure," R1-071689, 3GPP TSG-RAN-WG1 Meeting #48bis, Mar. 2007.
Samsung, "Downlink ACK/NACK Transmission Structure", R1-072247, 3GPP TSG RAN WG1 Meeting #49, May 2007.
Intellectual Property Office of India Application Serial No. 5825/CHENP/2009, Office Action dated Dec. 12, 2014, 1 page.
Kaiser, "Space Frequency Block Coding in the Uplink of Broadband MC-CDMA Mobile Radio Systems with Pre-Equalization", Institute of Electrical and Electronics Engineers, Vehicular Technology Conference, Fall 2003, XP10701084.
Texas Instruments, "Shared Control Channel Structure and Coding for E-UTRA Downlink", 3GPP TSG RAN WG1 LTE Ad Hoc, R1-061740, Jun. 2006.
LG Electronics, "Downlink Cat0 signaling for scheduling assignments", 3GPP TSG RAN WG1 #47bis, R1-070247, Jan. 2007.
NTT DoCoMo et al., "Comparison between RB-level and Sub-carrier-level Distributed Transmission for Shared Data Channel in E-UTRA Downlink", R1-062089, 3GPP TSG RAN WG1 Meeting #46, Sep. 2006.
Ryu, H.G., "System Design and Analysis of MIMO SFBC CI-OFDM System against the Nonlinear Distortion and Narrowband Interference," IEEE Transactions on Consumer Electronics, vol. 54, No. 2, pp. 368-375, May 2008.
Ryu, H.G., et al., "Design and Performance Evaluation of the MIMO SFBC CI-OFDM Communication System," The Fourth International Conference on Wireless and Mobile Communications, pp. 60-64, Jul. 2008.
Panasonic, "Mapping Positions of Control Channel for Uplink SC-FDMA", TSG-RAN WG1 #43, Doc. No. R1-051395, XP-002450961, Nov. 7, 2005.
3rd Generation Partnership Project (3GPP), "3rd Generation Partnership Project; Technical Specification Group Radio Access Network; LTE Physical Layer—General Description (Release 8)" 3GPP TS 36.201 V1.2.0, XP-050380347, Jun. 2007.
Su, W., et al., "Obtaining full-diversity space-frequency codes from space-time codes via mapping," IEEE Transactions on Signal Processing, vol. 51, No. 11, pp. 2903-2916, Nov. 1, 2003; XP-011102805.
Samsung, "Transmit Diversity for 4-Tx Antenna", 3GPP TSG RAN WG1 Meeting #49, R1-072238, May 7, 2007, XP-002578959.
Zhang, W., et al., "Space-Time/Frequency Coding for MIMO-OFDM in Next Generation Broadband Wireless Systems," Next-Generation CDMA vs. OFDMA for 4G Wireless Applications, IEEE Wireless Communications, vol. 14, No. 3, pp. 32-43, Jun. 2007, XP-011189164.
Kim, I.G., et al., "Transmit Diversity and Multiplexing Methods for 3G-LTE Downlink Control Channels," 64th IEEE Vehicular Technology Conference, Sep. 2006, XP-031051218.
Intel Corporation: "Text Proposal for downlink OFDMA resource allocation and mapping rules for distributed mode users in E-UTRA, with discussion on control information", R1-061149, 3GPP TSG RAN WG1 #45, May 2006, XP002486595.
ETRI: "Downlink L1/L2 control signaling", R1-070079, 3GPP TSG RAN WG1 Meeting #47bis, Jan. 2007, XP050104134.
LG Electronics, "Downlink ACK/NACK Index Mapping", R1-071552, 3GPP RAN WG1 #48-BIS, Mar. 2007, XP-002660818.
Qualcomm Europe, "Considerations on Multiplexing of Control and User Data for xFDMA based E-UTRA Uplink Evaluation", R1-051102, 3GPP TSG-RAN WG1 #42bis, Oct. 2005, XP-002446638.
LG Electronics, "Uplink ACK/NACK Index Mapping", R1-071547, 3GPP RAN WG1 #48-BIS, Mar. 2007, XP-002660822.
Panasonic, "Assignment of Downlink ACK/NACK channel", R1-072794, 3GPP TSG-RAN WG1 Meeting #49bis, Jun. 2007, XP-002660823.
NTT DoCoMo et al., "RB-level Distributed Transmission Method for Shared Data Channel in E-UTRA Downlink", R1-062285, 3GPP TSG-RAN WG1#46, Aug.-Sep. 2006.
Texas Instruments, "Shared Control Channel Structure and Coding for E-UTRA Downlink", R1-061433, 3GPP TSG-RAN WG1#45, May 2006.
U.S. Appl. No. 13/217,204, Notice of Allowance dated Apr. 8, 2013, 8 pages.
U.S. Appl. No. 13/295,884, Office Action dated Mar. 14, 2013, 8 pages.
U.S. Appl. No. 13/165,711, Office Action dated Mar. 13, 2013, 10 pages.
U.S. Appl. No. 13/295,987, Office Action dated Feb. 6, 2013, 8 pages.
U.S. Appl. No. 13/295,974, Office Action dated Jan. 29, 2013, 8 pages.
Taiwan Intellectual Property Office Application Serial No. 096136988, Office Action dated May 17, 2013, 6 pages.
U.S. Appl. No. 13/165,711, Final Office Action dated Aug. 9, 2013, 9 pages.
European Patent Office Application Serial No. 13185491.1, Search Report dated Nov. 7, 2013, 8 pages.
U.S. Appl. No. 13/941,277, Notice of Allowance dated Jan. 21, 2014, 9 pages.
NTT DoCoMo, et al., "ACK/NACK Signal Structure in E-UTRA Downlink," 3GPP TSG RAN WG1 Meeting #48, R1-070867, Feb. 2007, 3 pages.
LG Electronics, "Allocation of UL ACK/NACK index," 3GPP TSG RAN WG1 #49, R1-072348, May 2007, 4 pages.
European Patent Office Application Serial No. 14152103.9, Search Report dated Mar. 6, 2014, 7 pages.
Samsung, "Rules for mapping VRBs to PRBs," 3GPP RAN WG1 Meeting #44bis, R1-060808, Mar. 2006, 5 pages.
Ericsson, et al., "E-UTRA Downlink Control Signaling—Overhead Assessment," TSG-RAN WG1 #44, R1-060573, Feb. 2006, 7 pages.
U.S. Appl. No. 14/283,997, Office Action dated Oct. 2, 2014, 6 pages.
The State Intellectual Property Office of the People's Republic of China Application Serial No. 201210477694.9, Office Action dated Oct. 10, 2014, 5 pages.
NTT DoCoMo et al., "Downlink L1/L2 Control Signaling Channel Structure Mapping," R1-070104, 3GPP TSG RAN WG Meeting #47bis, Jan. 2007.

(56) References Cited

OTHER PUBLICATIONS

Ericsson et al., "Way Forward on Downlink Control Signaling," R1-071223, 3GPP TSG RAN WG1 Meeting #48, Feb. 2007.
NEC Group, "Efficient Downlink ACK/NACK signalling for E-UTRA," R1-071508, TSG-RAN WG1#48Bis, Mar. 2007.
Qualcomm Europe, "Mapping of UL ACK Transmission based on DL VRB", R1-070660, 3GPP TSG RAN1 #48, Feb. 2007.
Nortel, "Discussion on linkage of PHICH to uplink transmissions", R1-080771, 3GPP TSG-RAN WG1 Meeting #52, Feb. 2007.
Nortel, "SCH Search Performance with Transmit Diversity", R1-061843, 3GPP TSG-RAN Working Group 1 Meeting on LTE, Jun. 2006.
Samsung, "Performance of 4-Tx Antenna diversity with realistic channel estimation", R1-072239, 3GPP TSG RAN WG1 Meeting #49, May 2007.
Morimoto et al., "Transmit Diversity Schemes Suitable for Common Control Channel in Evolved UTRA Downlink", RCS2007-50, IEICE Technical Report, pp. 125-130, Jul. 2007.
Zhang, W., et al., "Universal Space-Frequency Block Coding for MIMO-OFDM Systems", IEEE Asia-Pacific Conference on Communications, pp. 227-231, Oct. 5, 2005.
Zhang, M., et al., "Space-Frequency Block Code with Matched Rotation MIMO-OFDM System with Limited Feedback", EURASIP Journal on Advances in Signal Processing, Jun. 24, 2009.
Motorola, "E-UTRA Downlink Control Channel Structure and TP," 3GPP TSG RAN1 #44, R1-060378, Feb. 2006, 7 pages.
Ericsson, et al., "DL Control Channel Structure," 3GPP Draft, R1-071820, Apr. 2007, 3 pages.
Panasonic, "CCE aggregation size and transport format signaling," 3GPP TSG-RAN WG1 Meeting #50, R1-073608, Aug. 2007, 8 pages.
LG Electronics, "Consideration on the amount of control channel overhead in downlink," 3GPP TSG RAN WG1 #49, R1-072353, May 2007, 5 pages.
Motorola, "Downlink Acknowledgment and Group Transmit Indicator Channels," 3GPP TSG RAN1 #45, R1-061165, May 2006, 4 pages.
Samsung, "DL ACK/NACK signalling," 3GPP RAN WG1 LTE Ad Hoc, R1-061697, Jun. 2006, 5 pages.
Via Telecom, "Hybrid CDM/TDM Structure for UL E-DCH," 3GPP TSG-RAN WG1 #38-bis, R1-041162, Sep. 2004, 3 pages.
European Patent Office Application Serial No. 07833138.6, Search Report dated Feb. 21, 2014, 10 pages.
European Patent Office Application Serial No. 07833139.4, Search Report dated Mar. 4, 2014, 7 pages.
United States Patent and Trademark Office U.S. Appl. No. 14/303,482, Office Action dated Apr. 15, 2015, 17 pages.
The State Intellectual Property Office of the People's Republic of China Application Serial No. 201310068333.3, Office Action dated May 12, 2015, 5 pages.
The State Intellectual Property Office of the People's Republic of China Application Serial No. 201310126189.4, Office Action dated May 29, 2015, 5 pages.

\* cited by examiner

METHOD FOR TRANSMITTING CONTROL SIGNAL USING EFFICIENT MULTIPLEXING

CROSS-REFERENCE TO RELATED APPLICATIONS

This application is a continuation of U.S. patent application Ser. No. 12/608,213, filed on Oct. 29, 2009, now U.S. Pat. No. 7,995,553, which is a continuation of U.S. patent application Ser. No. 12/444,100, filed on Apr. 2, 2009, now U.S. Pat. No. 7,953,061, which is the National Stage filing under 35 U.S.C. 371 of International Application No. PCT/KR2007/004825, filed on Oct. 2, 2007, which claims the benefit of earlier filing date and right of priority to Korean Patent Application Nos. 10-2007-0099055, filed on Oct. 2, 2007, and 10-2007-0011533, filed on Feb. 5, 2007, and also claims the benefit of U.S. Provisional Application Serial Nos. 60/955,019, filed on Aug. 9, 2007, and 60/827,852, filed on Oct. 2, 2006, the contents of which are all hereby incorporated by reference herein in their entirety.

TECHNICAL FIELD

The present invention relates to a method for transmitting a control signal in a multi-carrier mobile communication system, and more particularly, to a control signal transmitting method. Although the present invention is suitable for a wide scope of applications, it is particularly suitable for transmitting a control signal reliably in uplink/downlink transmission by multiplexing a plurality of 1-bit control signals efficiently.

BACKGROUND ART

Generally, in a multi-carrier mobile communication system, a base station performs downlink data packet transmission to user equipments (hereinafter abbreviated UEs) belonging to a cell or each of a plurality of cells. Meanwhile, a plurality of UEs may exist within a cell. Since each of the UEs is unable to know how a data packet will be transmitted to itself using a prescribed format, when a base station transmits a downlink data packet to a specific UE, the base station should transmit such necessary information as an ID of a UE that will receive the corresponding data packet, a time-frequency domain for carrying the data packet, a data transmission format including a coding rate, a modulation scheme and the like, HARQ relevant information, and the like in downlink for each downlink data packet transmission.

On the contrary, in order to enable a UE to transmit a data packet in uplink, a base station should transmit such necessary information as an ID of a UE that will be approved for data packet transmission, an uplink time-frequency domain enabling the UE to transmit the data packet, a data transmission format including a coding rate, a modulation scheme and the like, HARQ relevant information, and the like in downlink for each uplink data packet transmission.

In case of the uplink data packet transmission, a base station should transmit reception success acknowledgement/non-acknowledgement (ACK/NACK) information on each data having been transmitted by a UE to the corresponding UE in uplink. On the other hand, in case of downlink data packet transmission, each UE transmits information about reception success or failure for each data packet having been transmitted by a base station through ACK/NACK information in uplink.

In order to maintain an uplink transmission/reception power of each UE at a proper level, a base station should transmit power control information to each UE in downlink.

Among the above-explained control signals, an ACK/NACK signal, a power control signal or the like is mainly able to indicate the corresponding information using one bit and can be named '1-bit control signal'.

In order to operate and manage a system efficiently, it is necessary to multiplex an uplink/downlink control signal for carrying the above-explained control information, and more particularly, the 1-bit control signal with a data packet and other signals in a time-frequency resource efficiently.

As a multiplexing scheme normally used for a multi-carrier mobile communication system, time division multiple access (TDMA) for multiplexing a plurality of signals by dividing them on a time domain, frequency division multiple access (FDMA) for multiplexing a plurality of signals by dividing them on a frequency domain, code division multiple access (CDMA) for multiplexing signals on a prescribed time-frequency domain using an orthogonal code or a pseudo-orthogonal code, or the like can be used.

Yet, in case that the 1-bit control signal is multiplexed using TDMA and/or FDMA only, since a transmission power of each control signal considerably differs, an effect on a neighbor cell may differ on a time domain and/or a frequency domain.

In particular, when a random cell multiplexes to transmit ACK/NACK signals for different UEs within a single TTI by TDMA or FDMA for example, in case that an ACK/NACK signal transmission power for each of the UEs considerably differs, a quantity of interference imposed on neighbor cells by the corresponding cell may differ considerably on a time domain or a frequency domain. And, this may have a bad influence on performing downlink data packet scheduling in a cellular environment or time-frequency-energy distributions efficiently.

Moreover, in case that a control signal such as an ACK/NACK signal of a transmitting side is lost in the course of downlink/uplink channel transmission, there may be a problem of reliability on the corresponding signal transmission.

DISCLOSURE OF THE INVENTION

Technical Problem

Technical Solution

Accordingly, the present invention is directed to a method for transmitting a control signal in a multi-carrier mobile communication system that substantially obviates one or more of the problems due to limitations and disadvantages of the related art.

An object of the present invention is to provide a method of transmitting a plurality of control signals efficiently, by which a control signal of a specific transmitting side can be reliably transmitted in a manner of performing multiplexing efficiently to minimize inter-cell interference in control signal transmission.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of transmitting a control signal according to the present invention includes multiplexing a plurality of 1-bit control signals within a prescribed time-frequency domain by code division multiple access (CDMA), repeating the multiplexed control signals in different frequency domains, and transmitting the repeated control signals.

To achieve these and other advantages and in accordance with the purpose of the present invention, as embodied and broadly described, a method of transmitting a control signal according to the present invention includes multiplexing a plurality of 1-bit control signals within a prescribed time-frequency domain by code division multiple access (CDMA), and transmitting the multiplexed control signals, wherein a plurality of the 1-bit control signals include a plurality of the 1-bit control signals for a specific transmitting side.

Preferably, wherein the prescribed time-frequency domain comprises a time-frequency domain within 1 OFDM symbol zone.

Preferably, wherein in case that a time domain used for the control signal transmission comprises a single OFDM symbol zone, the repeating is carried out in a manner of repeating the multiplexed control signals into the different frequency domains within the single OFDM symbol zone.

Preferably, wherein in case that a time domain used for the control signal transmission comprises a plurality of OFDM symbol zones, the repeating is carried out in a manner of repeating the multiplexed control signals into the different frequency domains within the OFDM symbol zones differing from each other.

Preferably, in the multiplexing, a plurality of the 1-bit control signals are discriminated by an orthogonal or pseudo-orthogonal code used for multiplexing of each of the 1-bit control signals.

More preferably, a plurality of the 1-bit control signals are modulated by being discriminated by different orthogonal phase components, respectively and wherein in the multiplexing, a plurality of the 1-bit control signals are additionally discriminated by the different orthogonal phase components used for the modulation.

Preferably, the prescribed time-frequency domain includes a plurality of time-frequency domains. In the multiplexing, additional multiplexing is carried out by at least one selected from the group consisting of time division multiple access (TDMA) and frequency division multiple access (FDMA). And, a plurality of the 1-bit control signals for the specific transmitting side are multiplexed by being spread in a plurality of the time-frequency domains.

More preferably, the 1-bit control signals for different transmitting sides are multiplexed in a plurality of the time-frequency domains by the code division multiple access, respectively. In this case, a plurality of the 1-bit control signals for the specific transmitting side are multiplexed by different orthogonal or pseudo-orthogonal codes.

And, the orthogonal or pseudo-orthogonal code includes a code sequence having a length corresponding to a size of a plurality of the time-frequency domains.

Besides, the 1-bit control signal can include either an ACK/NACK signal or a power control signal. And, the 1-bit control signal can be transmitted in either uplink or downlink.

It is to be understood that both the foregoing general description and the following detailed description are exemplary and explanatory and are intended to provide further explanation of the invention as claimed.

Advantageous Effects

According to one embodiment of the present invention, in multiplexing a plurality of 1-bit control signals, CDMA is mainly used. And, it is able to transmit a plurality of controls signals of a specific UE through different orthogonal or pseudo-orthogonal codes, respectively. Hence, it is able to enhance reliability on the corresponding control signal transmission.

And, the number of multiplexed signals in coherence bandwidth and/or coherence time can be increased by carrying out FDMA and/or TDMA on the 1-bit control signal transmission side by side and by distributing to transmit a plurality of control signals for a specific UE on each time-frequency domain.

Moreover, in case of transmitting the 1-bit control signal through a plurality of time-frequency domains, by specifying to use an orthogonal code used for transmission in accordance with the size the whole time-frequency domains instead of the size of each the time-frequency domain, it is able to increment a number of control signals that can be simultaneously transmitted.

Besides, in case that a plurality of OFDM symbols are used for 1-bit control signal transmission, by transmitting a CDMA modulated 1-bit control signal on a different OFDM symbol area through a different frequency domain, it is able to perform efficient transmission in aspects of resource efficiency and diversity gain. And, it is also able to make a power allocation more flexible within each OFDM symbol area.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Mode for Invention

Reference will now be made in detail to the preferred embodiments of the present invention, examples of which are illustrated in the accompanying drawings.

Generally, a base station transmits an ACK/NACK signal indicating a success or failure in receiving a data packet transmitted by each UE within a cell or a control signal playing a role similar to that of the ACK/NACK signal to the corresponding UE in downlink. In doing so, since a plurality of UEs are able to transmit uplink data packets within a single TTI, the base station is able to transmit ACK/NACK signals to a plurality of the UEs within a single TTI as well.

And, a base station multiplexes a plurality of power control signals for controlling transmission powers of uplink data of a plurality of UEs for a single TTI within a cell and then transmits the multiplexed signal to each of the UEs.

Hence, according to one embodiment of the present invention, in order to multiplex and transmit a plurality of 1-bit control signals efficiently, a method of multiplexing to transmit a plurality of 1-bit control signals by CDMA within a partial time-frequency domain of a transmission band in a multi-carrier system is proposed. And, this will be explained with reference to a detailed example.

Meanwhile, the description for one embodiment of the present invention relates to a case that a 1-bit control signal is an ACK/NACK signal for example. In a control signal transmitting method according to one embodiment of the present invention, a 1-bit control signal needs not to be an ACK/NACK signal necessarily. And, it is apparent to those skilled in the art that the present invention includes a random 1-bit control signal in a format that a plurality of signals are transmitted within 1 TTI.

Figure 1:
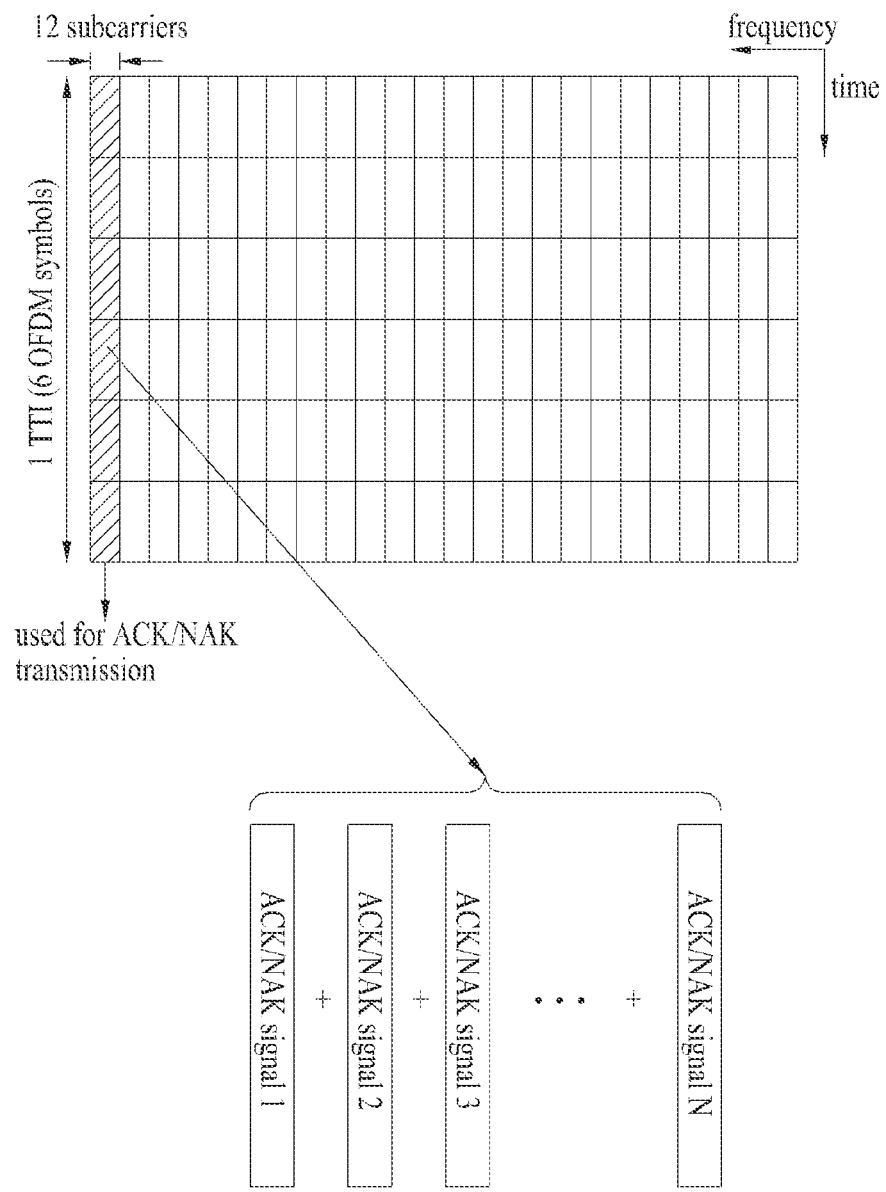
FIG. 1 is a diagram for explaining a method of multiplexing to transmit ACK/NACK signals by CDMA according to one embodiment of the present invention.

FIG. 1 is a diagram for explaining a method of multiplexing to transmit ACK/NACK signals by CDMA according to one embodiment of the present invention.

Referring to FIG. 1, according to one embodiment of the present invention, a base station reserves a specific time-frequency domain within 1 TTI for ACK/NACK transmission to use. And, ACK/NACK signals for different UEs are discriminated from each other by an orthogonal or pseudo-orthogonal code multiplied on a time-frequency domain.

In this case, the 'orthogonal code' or the 'pseudo-orthogonal code' is a code used for signal multiplexing in CDMA and means a code that indicates that a correlation is 0 or a value smaller than a prescribed threshold.

According to one preferred embodiment of the present invention, in case of performing a transmission through modulation that uses components having phases orthogonal to each other like QPSK, a plurality of ACK/NACK signals can be additionally discriminated through the different orthogonal phase components.

In an example shown in FIG. 1, since an ACK/NACK signal is transmitted through a time-frequency domain including 12 subcarriers across six OFDM symbols within a single TTI, it is able to use an orthogonal code having a chip length 72 (=6×12) for the ACK/NACK transmission. Hence, it is possible to simultaneously transmit 72 different orthogonal signals. Yet, a number of simultaneously transmittable orthogonal signals may vary in accordance with a type of a used orthogonal/pseudo-orthogonal code.

In case of using QPSK as a modulation scheme in the example shown in FIG. 1, it is able to use two orthogonal phases. Hence, it is able to transmit different orthogonal signals amounting to a double of the seventy-two orthogonal signals.

Meanwhile, an ACK/NACK signal for a single UE can be transmitted via a single orthogonal signal among the orthogonal signals generated by the above-explained method. Yet, one embodiment of the present invention proposes that an ACK/NACK signal for a single UE is set to be transmitted via a plurality of orthogonal signals if the single ACK/NACK signal carries information exceeding 1 bit or if a single UE transmits a plurality of data packets for a single TTI.

Like the above-explained one embodiment of the present invention, an advantage in multiplexing to transmit an ACK/NACK signal by CDMA in downlink lies in that a quantity of interference generated in downlink by an ACK/NACK signal on a time-frequency domain of a single TTI can be maintained relatively equal.

In particular, if a random cell multiplexes to transmit ACK/NACK signals for different UEs by TDMA or FDMA within a single TTI, as mentioned in the foregoing description, if ACK/NACK signal transmission powers for the respective UEs considerably differ from each other, an interference quantity having influence on neighbor cells by the corresponding cell can vary on a time domain or a frequency domain considerably. And, this may have bad influence on performing downlink data packet scheduling or other time-frequency-energy distribution in a cellular environment. Yet, in case that an ACK/NACK signal is multiplexed by CDMA like one embodiment of the present invention, even if different ACK/NACK signal transmission powers are allocated to different UEs, ACK/NACK signals for the entire UEs are added together within a same time-frequency domain for a single TTI and then transmitted. Hence, fluctuation of transmission power on a time-frequency domain can be minimized.

Like one embodiment of the present invention, in case that a plurality of ACK/NACK signals transmitted by a single UE or for data transmission of a single UE are transmitted via a plurality of orthogonal signals, it is able to enhance reliability of ACK/NACK signal transmission to the corresponding UE.

Moreover, the above-explained principle for the downlink transmission of the ACK/NACK signal is identically applicable to uplink transmission.

Meanwhile, in multiplexing ACK/NACK signal by CDMA, as mentioned in the foregoing description, orthogonality between the different ACK/NACK signals multiplexed by CDMA can be maintained only if a downlink radio channel response characteristic is not considerably changed on a time-frequency domain for carrying the ACK/NACK signal. Hence, it is able to obtain satisfactory reception performance without applying a special reception algorithm such as a channel equalizer in a receiving end. Preferably, CDMA multiplexing of ACK/NACK signal is carried out within a time-frequency domain, in which a radio channel response is not considerably changed, i.e., within a coherent time and a coherent bandwidth.

According to a detailed embodiment of the present invention, a CDMA multiplexing scheme of ACK/NACK signal can be carried out side by side with a FDMA or TDMA multiplexing scheme to narrow a time-frequency domain for multiplexing ACK/NACK signal by COMA within a coherent range in which a radio channel response characteristic is not considerably changed. This is explained as follows.

Figure 2:
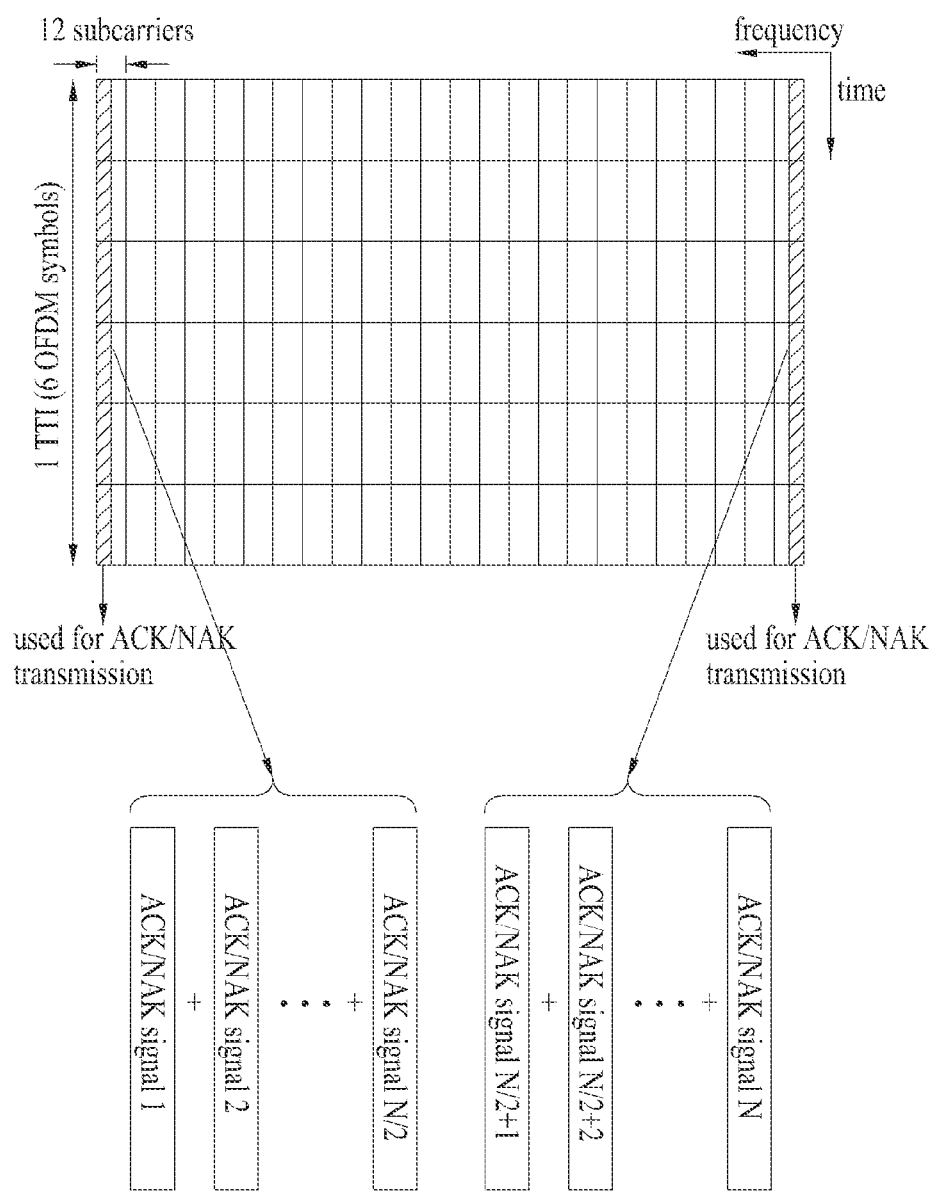
FIG. 2 is a diagram for explaining a method of transmitting ACK/NACK signals by carrying out multiplexing side by side with CDMA and FDMA according to one embodiment of the present invention.

FIG. 2 is a diagram for explaining a method of transmitting ACK/NACK signals by carrying out multiplexing side by side with CDMA and FDMA according to one embodiment of the present invention.

Referring to FIG. 2, different ACK/NACK signals can be transmitted in time-frequency domains separated from each other on two frequency axes. And, different ACK/NACK signals can be multiplexed by CDMA in each of the time-frequency domains. In this case, according to one embodiment of the present invention, as ACK/NACK signals are transmitted through two frequency domains, it can be observed that a width of each of the frequency domains is set to a 6-subcarrier zone narrower than a 12-subcarrier zone.

In particular, in the example shown in FIG. 2, since each of the two time-frequency domains includes six OFDM symbols and twelve subcarriers, it is able to transmit 36 (=6×6) orthogonal signals by CDMA. Since two time-frequency domains are used within a single TTI, it is able to transmit 72 (=36×2) orthogonal signals.

In case that QPSK modulation is used, since ACK/NACK signal can be additionally discriminated using two orthogonal phases, it is able to transmit different orthogonal signals amounting to two times of the 72 orthogonal signals.

Figure 3:
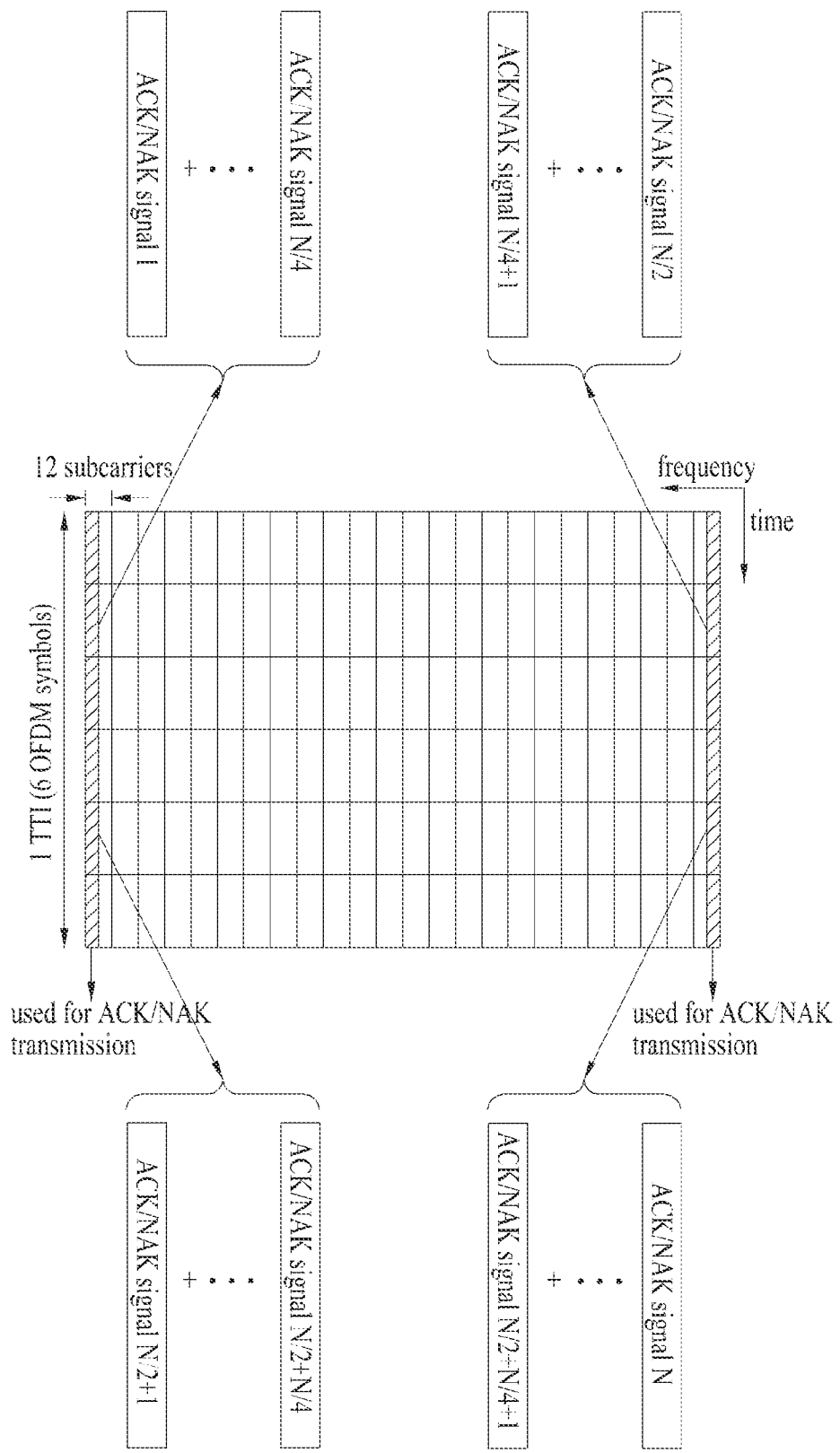
FIG. 3 is a diagram for explaining a method of transmitting ACK/NACK signals by carrying out multiplexing side by side with CDMA, TDMA and FDMA according to one embodiment of the present invention.

FIG. 3 is a diagram for explaining a method of transmitting ACK/NACK signals by carrying out multiplexing side by side with CDMA, TDMA and FDMA according to one embodiment of the present invention.

In particular, FIG. 3 shows an example that multiplexing is carried out on ACK/NACK signals side by side with CDMA, FDMA and TDMA.

Referring to FIG. 3, different ACK/NACK signals can be transmitted on four time-frequency domains having less channel variations. And, different ACK/NACK signals can be multiplexed in each of the time-frequency domains by CDMA.

In particular, in the example shown in FIG. 3, since each of the time-frequency domains includes three OFDM symbols and six subcarriers, it is able to transmit 18 (=3×6) ACK/NACK signals in each domain by CDMA. Since four time-frequency domains are used within a single TTI, it is also able to transmit 72 (=18×4) ACK/NACK signals. Since two orthogonal phases are usable for QPSK transmission, it is able to transmit a double of the different ACK/NACK signals.

In the above-explained ACK/NACK signal multiplexing scheme shown in FIG. 2 or FIG. 3, the scheme for transmitting the different ACK/NACK signals in each of the time-frequency domains is more advantageous than that of FIG. 1 in that each of the ACK/NACK signals can be transmitted within the time-frequency domain having not considerable fluctuation of the radio channel response characteristic. Yet, in case that a radio channel quality for a prescribed UE in the time-frequency domain for carrying the ACK/NACK signals is poor, ACK/NACK reception performance of the corresponding UE can be considerably degraded.

Hence, one embodiment of the present invention proposes that ACK/NACK signals for a specific UE within a single TTI are transmitted across time-frequency domains distant from a plurality of time-frequency axes. And, one embodiment of the present invention also proposes a scheme for obtaining a time-frequency diversity gain for ACK/NACK signal reception in a receiving end by multiplexing ACK/NACK signals for different UEs by CDMA in each time-frequency domain.

Figure 4:
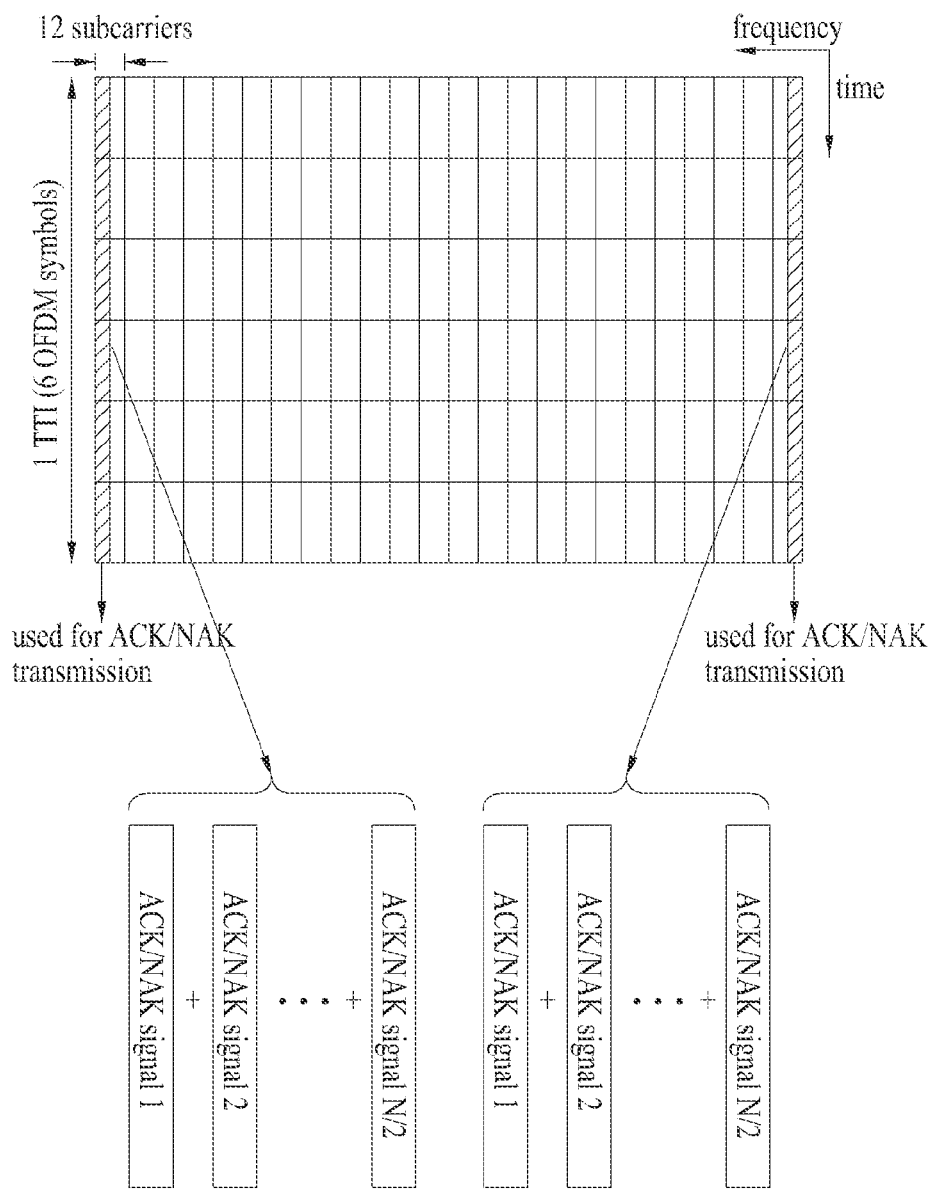
FIG. 4 is a diagram for explaining a method of transmitting ACK/NACK signals by carrying out multiplexing side by side with CDMA and FDMA according to one embodiment of the present invention, in which a plurality of ACK/NACK signals transmitted by a specific transmitting side among a plurality of ACK/NACK signals are transmitted through a plurality of frequency domains.

FIG. 4 is a diagram for explaining a method of transmitting ACK/NACK signals by carrying out multiplexing side by side with CDMA and FDMA according to one embodiment of the present invention, in which a plurality of ACK/NACK signals transmitted by a specific transmitting side among a plurality of ACK/NACK signals are transmitted through a plurality of frequency domains.

Referring to FIG. 4, a receiving side is able to obtain a frequency diversity gain in a manner that an ACK/NACK signal is transmitted across two different frequency domains. In the example shown in FIG. 4, an ACK/NACK signal is transmitted across two time-frequency domains and different ACK/NACK signals are multiplexed in each of the time-frequency domains.

In particular, since each of the time-frequency domains includes six OFDM symbols and six subcarriers, there exist 36 (6×6) ACK/NACK signals that can be multiplexed by CDMA in each of the time-frequency domains. Since two orthogonal phases are usable for QPSK transmission, it is able to transmit a double of the different ACK/NACK signals.

As mentioned in the foregoing description, in multiplexing different ACK/NACK signals within each of the time-frequency domains using an orthogonal code regulated in accordance with the size of each time-frequency domain, ACK/NACK signals transmitted via different time-frequency domains for a specific UE can be multiplexed using the same orthogonal code among orthogonal codes used for each of the time-frequency domains.

Yet, one embodiment of the present invention proposes that ACK/NACK signals transmitted via different time-frequency domains for a specific UE are multiplexed using different orthogonal codes among orthogonal codes used for each of the time-frequency domains.

Thus, in case that ACK/NACK signals for a specific UE are multiplexed using different orthogonal codes in each domain, it is able to prevent reception performance from being reduced by special orthogonality reduction influence with other ACK/NACK signals with which a specific ACK/NACK signal is CDMA multiplexed for a specific TTI. And, this scheme can be extended to enable ACK/NACK signal of a specific UE to be transmitted using different orthogonal codes in different time-frequency domains even if the ACK/NACK signal is transmitted via at least three time-frequency domains.

In case that ACK/NACK signals are transmitted via a plurality of time-frequency domains, as shown in FIG. 4, one preferred embodiment of the present invention proposes that more ACK/NACK signals can be simultaneously transmitted in a manner of specifying orthogonal codes in accordance with the size of the entire domains instead of specifying an orthogonal code in accordance with in the size of each the time-frequency domain and then transmitting a plurality of ACK/NACK signals correspondingly.

In particular, in the example shown in FIG. 4, by obtaining 72 orthogonal codes in accordance with 72 (=6×12) chip length according to six OFDM symbols and 12 subcarriers belonging to two time-frequency domains for carrying a plurality of ACK/NACK signals of a specific UE instead of 36 chip length according to six OFDM symbols and six subcarriers belonging to a single time-frequency domain, it is able to simultaneously transmit 144 ACK/NACK signals using different orthogonal phases in case of using QPSK transmission.

In this case, a problem generated from a fact that orthogonality between orthogonal codes is reduced due to a considerable difference between radio channel responses of different time-frequency domains can be overcome by allocating ACK/NACK transmission powers differing from each other in accordance with partial cross correlation characteristics between orthogonal codes.

In particular, if transmission powers of orthogonal codes within a corresponding group are matched by grouping codes decided as having low orthogonality among the above-specified orthogonal codes, the above orthogonality problem can be solved.

Figure 5:
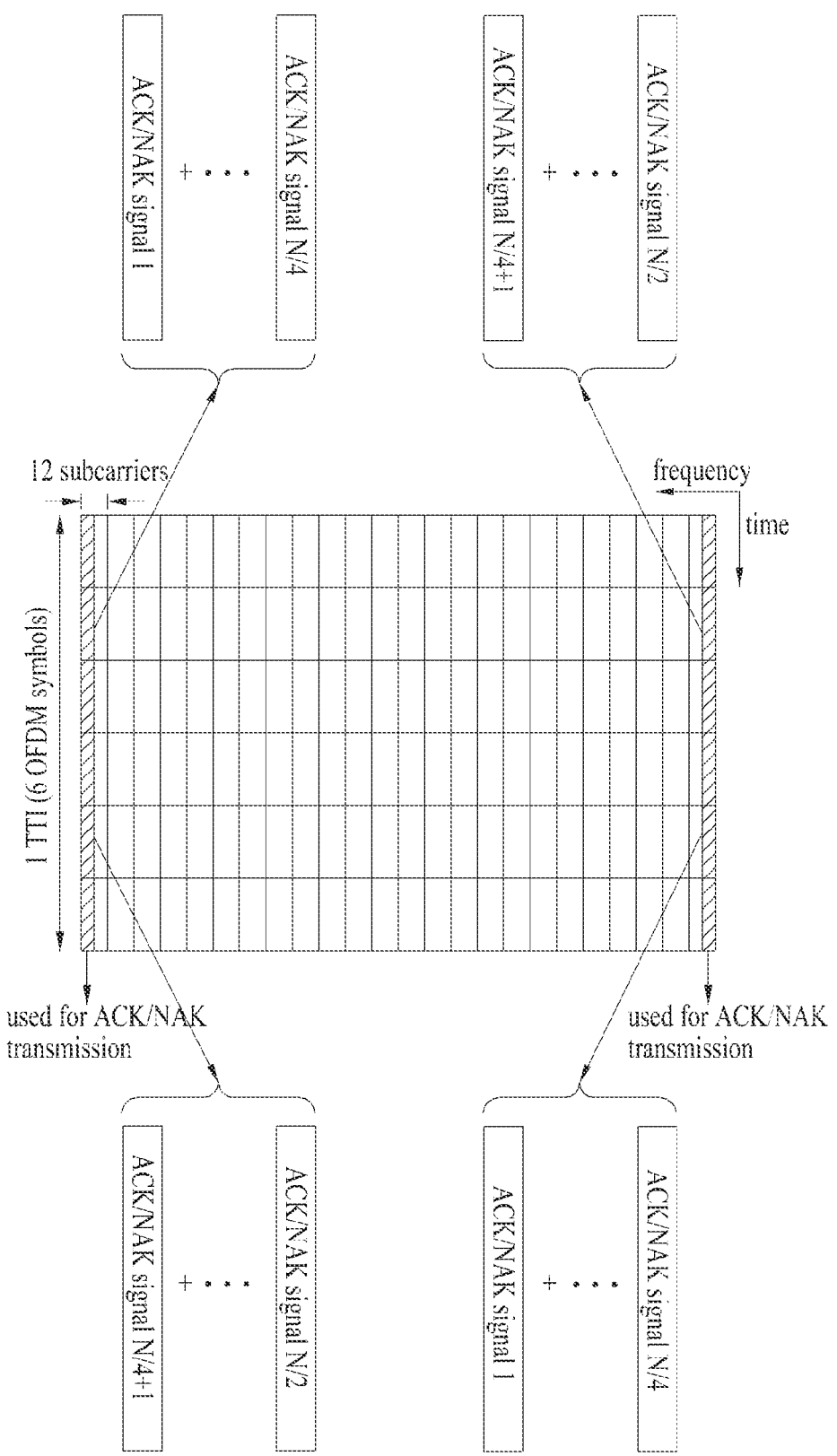
FIG. 5 is a diagram for explaining a method of transmitting ACK/NACK signals by carrying out multiplexing side by side with CDMA, TDMA and FDMA according to one embodiment of the present invention, in which a plurality of ACK/NACK signals transmitted by a specific transmitting side among a plurality of ACK/NACK signals are transmitted through a plurality of time-frequency domains.

FIG. 5 is a diagram for explaining a method of transmitting ACK/NACK signals by carrying out multiplexing side by side with CDMA, TDMA and FDMA according to one embodiment of the present invention, in which a plurality of ACK/NACK signals transmitted by a specific transmitting side among a plurality of ACK/NACK signals are transmitted through a plurality of time-frequency domains.

FIG. 5 shows an example that a time-frequency diversity gain is obtained in a manner that ACK/NACK signals for a specific UE are transmitted across two different time-frequency domains.

In particular, ACK/NACK signals for UEs 1 to N/4 are transmitted via a time-frequency domain placed in a left upper part of FIG. 5 and a time-frequency domain placed in a right lower part of FIG. 5, while ACK/NACK signals for UEs N/4+1 to N/2 are transmitted via a time-frequency domain placed in a left lower part of FIG. 5 and a time-frequency domain placed in a right upper part of FIG. 5.

In particular, ACK/NACK signals for a specific UE in the example shown in FIG. 5 are transmitted across two time-frequency domains. Different ACK/NACK signals are multiplexed by CDMA within each of the time-frequency domains and then transmitted.

Moreover, eighteen ACK/NACK signals can be transmitted via orthogonal codes corresponding to 18 (=3×6) chip length across three OFDM symbols and six subcarriers within each of the time-frequency domains. Since two orthogonal phases are usable for QPSK transmission, it is able to transmit 36 different ACK/NACK signals amounting to a double of the former ACK/NACK signals.

In the example shown in FIG. 5, it is able to discriminate ACK/NACK signals transmitted via different time-frequency domains for a specific UE from other ACK/NACK signals using the same orthogonal code. Yet, a diversity gain can be obtained by multiplexing the ACK/NACK signals within each of the time-frequency domains using different orthogonal codes.

Moreover, in the example shown in FIG. 5, in case that orthogonal codes are specified with reference to in the size of the entire time-frequency domains instead of specifying orthogonal codes with reference to in the size of each time-frequency domain, it is able to transmit more ACK/NACK signals simultaneously.

In particular, by specifying orthogonal codes not for chip length constructed with three symbols and six subcarriers included in each of the time-frequency domains but for 72 chip length constructed with total six OFDM symbols and 12 subcarriers, it is able to transmit more ACK/NACK signals simultaneously.

In the above-explained embodiments shown in FIGS. 1 to 5, a 1-bit control signal such as an ACK/NACK signal is transmitted by spreading in 3 or 6 OFDM symbol zones by CDMA for example. Yet, an OFDM symbol zone usable for transmission of 1-bit control signal such as ACK/NACK signal can include at least one or more OFDM symbols.

Among the 1-bit control signal (ACK/NACK signal) transmitting methods according to the above-explained embodiments of the present invention, the method of transmitting ACK/NACK signals repeatedly in a plurality of time-frequency domains to secure the transmission diversity gain can be diversified in accordance with a number of available OFDM symbol zones. In the following description, a method of transmitting ACK/NACK efficiently in accordance with a number of OFDM symbols used for the ACK/NACK signal transmission is described.

Figure 6:
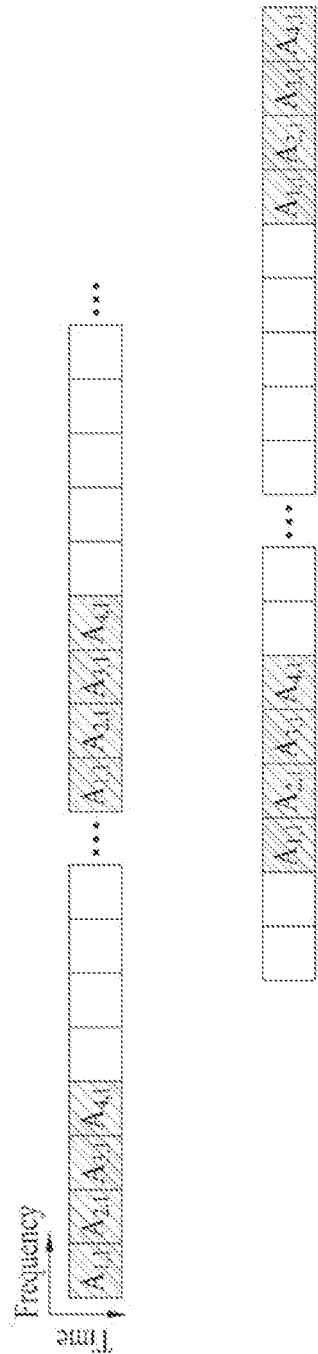
FIG. 6 is a diagram for explaining a method of transmitting ACK/NACK in case of using 1 OFDM symbol zone for ACK/NACK transmission according to one embodiment of the present invention.

FIG. 6 is a diagram for explaining a method of transmitting ACK/NACK in case of using 1 OFDM symbol zone for ACK/NACK transmission according to one embodiment of the present invention.

In detail, FIG. 6 shows that four ACK/NACK signals are spread at a spreading factor (SF) 4 in 1 OFDM symbol zone, multiplexed by CDMA and then transmitted. In FIG. 6, a single box indicates a single subcarrier zone. And, $A_{ij}$ indicates an ACK/NACK signal multiplexed by CDMA. In this case, 'i' is an index of a spread and multiplexed signal and 'j' is an index indicating a group of the multiplexed ACK/NACK signal. An ACK/NACK group indicates a set of the multiplexed ACK/NACK signals. And, a plurality of ACK/NACK groups can exist in accordance with necessity of each system and a resource situation. For clarity and convenience, FIG. 6 assumes that there exists a single ACK/NACK group only.

Since the present embodiment assumes a case that a single OFDM symbol is used for ACK/NACK transmission only, it is unable to obtain a diversity gain on a time axis for ACK/NACK signal transmission.

Yet, to obtain a diversity gain on a frequency axis, ACK/NACK signals multiplexed on the frequency axis by CDMA can be repeatedly transmitted in different frequency domains.

FIG. 6 shows an example that ACK/NACK signals multiplexed by CDMA are four times repeated in different frequency domains. In this case, the four times repetition is just an example to obtain diversity. A count of repetitions can vary in accordance with a channel status and a resource situation of system. In FIG. 6, each of the four times repeated ACK/NACK signals has the same indices (i, j) for emphasizing the repetition of the signals. But, each of the four times repeated ACK/NACK signals can be multiplexed by different orthogonal code or like, so in this case, these signals can be a different signal to each other. But, for convenience of explanation, this possibility of differentiation of each repeated signal will be ignored in the whole context.

FIG. 6 deals with a case that a single OFDM symbols is used for ACK/NACK transmission. The case of using a single OFDM symbols is just an example for describing the present invention. And, the present invention is applicable to a case of using a plurality of OFDM symbols as well.

In more particularly, in case that ACK/NACK is transmitted via several OFDM symbols, repetition on a time axis is also applicable as well as a repetition on a frequency axis in order to obtain additional diversity as well as transmitting antenna diversity.

In the following description, a case of using a plurality of OFDM symbols for ACK/NACK signal transmission is described.

In case that OFDM symbols for ACK/NACK transmission are incremented, it is able to use ACK/NACK signals in case of using a single OFDM symbol for ACK/NACK transmission can be repeatedly used for the incremented OFDM symbols intactly. In this case, since the OFDM symbols used for the ACK/NACK transmission are incremented, it is able to more power of a signal used for the ACK/NACK transmission. Hence, it is able to transmit the ACK/NACK signals to a wider area of a cell.

Figure 7:
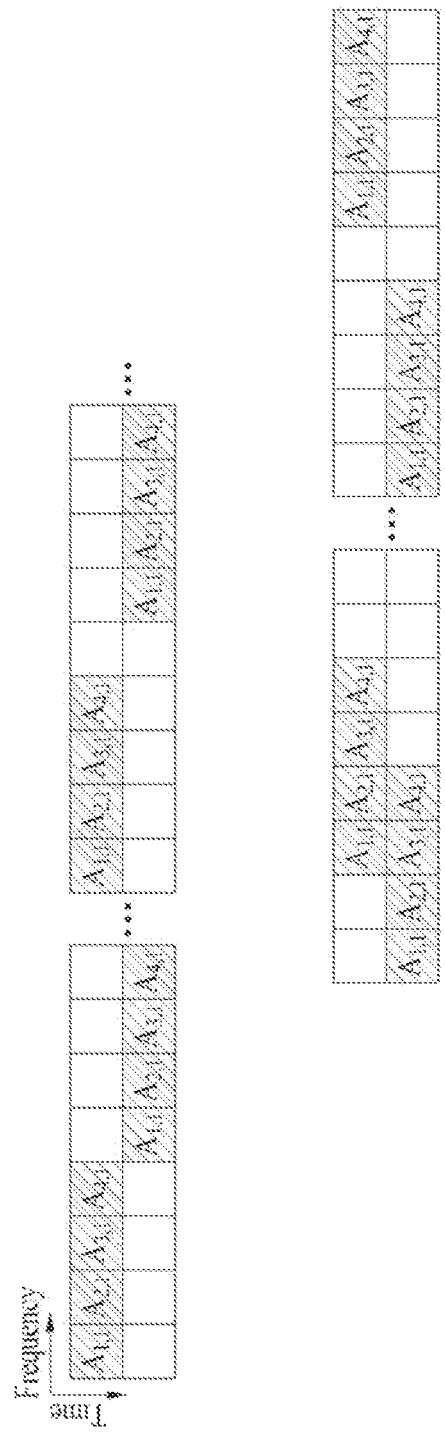
FIG. 7 is a diagram for explaining a method of transmitting ACK/NACK in case of using at least 2 OFDM symbol zones for ACK/NACK transmission according to one embodiment of the present invention.

FIG. 7 is a diagram for explaining a method of transmitting ACK/NACK in case of using at least 2 OFDM symbol zones for ACK/NACK transmission according to one embodiment of the present invention.

FIG. 7 shows an ACK/NACK signal transmitting method when a number of OFDM symbols for ACK/NACK signal transmission is incremented into 2, in transmitting ACK/NACK signals having the same spreading factor as FIG. 6. In particular, FIG. 7 shows a case that a structure in using a single OFDM symbol for ACK/NACK transmission like FIG. 6 is intactly and repeatedly applied to a second OFDM symbol.

In case of the transmission with the above structure, even if a symbol number is incremented, the number of transmittable ACK/NACK signals is equal to that of the case of using a single OFDM symbol. This is because more time-frequency resources are used for the transmission of the same number of ACK/NACK signals by substantially incrementing the time-frequency repetition count as more OFDM symbols are used for the ACK/NACK signals repeated on the frequency axis only in case of using a single OFDM symbol only.

In case of performing the transmission by this method, more power can be allocated to the ACK/NACK transmission but waste or resource may take place. In case that more OFDM symbols are used for the ACK/NACK signal transmission to reduce the waste of resource, if a transmission is performed by decrementing the repetition count on the frequency axis per the OFDM symbol, the same time-frequency domain as the case of using a single OFDM symbol can be occupied. Hence, it is able to utilize resources more efficiently.

Figure 8:
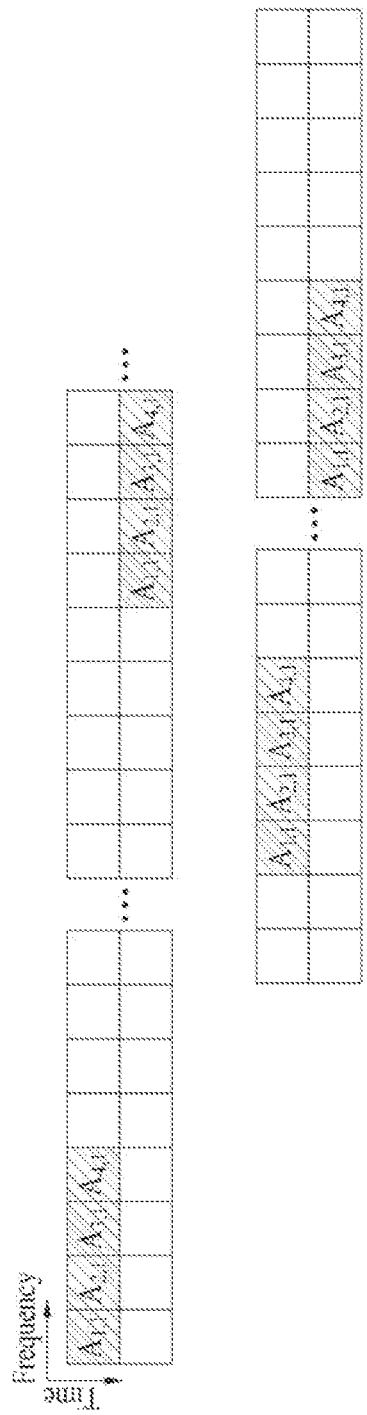
FIG. 8 is a diagram for explaining a method of transmitting ACK/NACK in case of using at least 2 OFDM symbol zones for ACK/NACK transmission according to one preferred embodiment of the present invention.

FIG. 8 is a diagram for explaining a method of transmitting ACK/NACK in case of using at least 2 OFDM symbol zones for ACK/NACK transmission according to one preferred embodiment of the present invention.

FIG. 8 shows an example that resources are more efficiently utilized by decrementing a frequency axis repetition count of ACK/NACK signals multiplexed by CDMA in case that the number of OFDM symbols for ACK/NACK signal transmission are incremented into two.

Although ACK/NACK signals are repeated twice compared to four times in FIG. 6, as the number of OFDM symbols used for the ACK/NACK signal transmission is incremented, the use of four time-frequency resource domains is the same as the case of using a single OFDM symbol.

Compared to FIG. 7 which shows the case of performing transmission by applying the same ACK/NACK signal structure to the entire OFDM symbols, assuming that the same time-frequency resource is used, FIG. 8 shows that ACK/NACK signal transmission is possible twice. Hence, resources can be more efficiently used.

Comparing to FIG. 7, since the number of, time-frequency resource domains used for the ACK/NACK signal transmission is decremented, a signal power for the ACK/NACK signal transmission may become less. Yet, since the overall ACK/NACK signals are transmitted across the time-frequency domain, more efficient transmission power allocation per symbol is possible rather than the case of transmitting the ACK/NACK signals using a single OFDM symbol only.

Referring to FIG. 8, when a plurality of OFDM symbol zones are used for ACK/NACK transmission, in case that the method of transmitting a specific ACK/NACK signal via a different frequency domain in each OFDM symbol zone according to the present embodiment is taken, it is more advantageous that power allocation to each ACK/NACK signal can be carried out more flexibly rather than the method of transmitting ACK/NACK via different frequency domains within each OFDM symbol zone. This is explained in detail with reference to FIG. 9 as follows.

Figure 9:
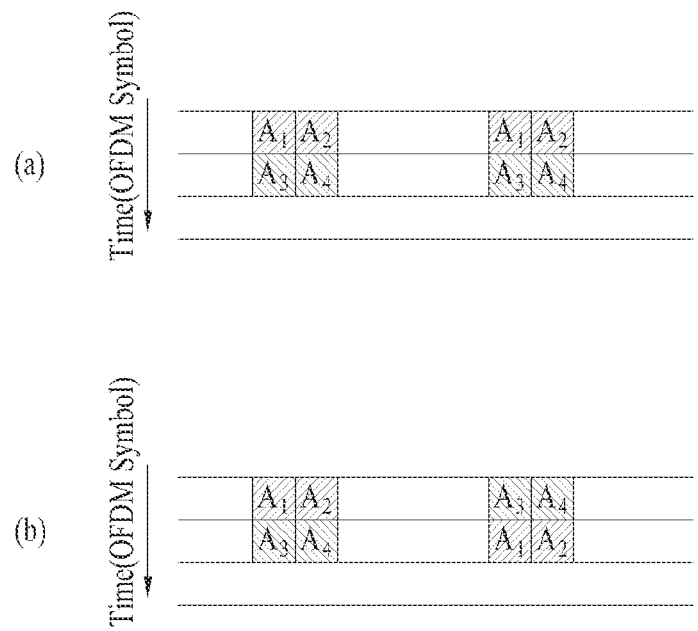
FIG. 9 is a diagram to explain a principle that power allocation flexibility is increased in case of transmitting ACK/NACK signals by the embodiment shown in FIG. 8.

FIG. 9 is a diagram to explain a principle that power allocation flexibility is increased in case of transmitting ACK/NACK signals by the embodiment shown in FIG. 8.

In (a) and (b) of FIG. 9, $A_1$, $A_2$, $A_3$ and $A_4$ indicate ACK/NACK signal groups multiplexed by CDMA, respectively. In particular, (a) of FIG. 9 shows a format that CDMA-multiplexed ACK/NACK signals are transmitted by being repeated in different frequency domains within a same symbol zone. And, (b) of FIG. 9 shows a format that CDMA-multiplexed ACK/NACK signals of the present embodiment are transmitted by being repeated in different frequency domains within different OFDM symbol zones, respectively.

In case that ACK/NACK signals are transmitted in a same manner shown in (a) of FIG. 9, total powers allocated to the respective OFDM symbol zones should be allocated by being distributed to two ACK/NACK signals. On the contrary, in case that ACK/NACK signals are transmitted in a same manner shown in (b) of FIG. 9, total powers allocated to the respective OFDM symbol zones can be allocated by being distributed to four ACK/NACK signals. Hence, flexibility of power allocation can be enhanced more than that of the case shown in (a) of FIG. 9.

In other words, when the number of OFDM symbol zones available for ACK/NACK transmission is plural like the present embodiment, in case that ACK/NACK signals are transmitted via different frequency domains in different OFDM symbols, flexibility in power allocation is enhanced to diversify power allocation for ACK/NACK signals per a user.

In the above-explained embodiment of the present invention, a spreading factor for multiplexing of a plurality of ACK/NACK signals, a repetition count in time-frequency domain, and the number of OFDM symbols for ACK/NACK signal transmission are just exemplary for the accurate explanation of the present invention but other spreading factors, other repetition counts and various numbers of OFDM symbols are applicable to the present invention.

In the above-described example for explaining the present invention in accordance with the time-frequency resource, a case of using a single transmitting antenna that does not use transmitting antenna diversity is represented only. Alternatively, the present invention is also applicable to the case of using a two transmitting antennas diversity scheme or a four transmitting antennas diversity scheme.

It is apparent to those skilled in the art that the above-explained scheme for obtaining the time-frequency diversity gain from the ACK/NACK signal transmission can be used side by side with the scheme of using FDMA or TDMA as well as the case of using CDMA for the multiplexing of different ACK/NACK signals according to one embodiment of the present invention.

The above-explained multiplexing and transmission schemes of ACK/NACK signals are identically applicable to the multiplexing and transmission scheme of a plurality of power control signals transmitted to different UEs in downlink. Particularly, a downlink ACK/NACK signal and a downlink power control signal can be transmitted by being multiplexed in the same time-frequency domain by CDMA.

Moreover, the above-explained ACK/NACK signal multiplexing and transmission schemes are identically applicable to uplink ACK/NACK signal transmission for data packets transmitted in downlink as well.

Moreover, if the number of OFDM symbols used for transmission of ACK/NACK signal can be variable in a specific system, it is preferable that the number of repetition of ACK/NACK signal is decreased in accordance with the increase of the OFDM symbols used.

INDUSTRIAL APPLICABILITY

According to one embodiment of the present invention, in multiplexing a plurality of 1-bit control signals, a plurality of control signals of a specific UE can be transmitted via orthogonal or pseudo-orthogonal codes differing from each other using CDMA mainly. Hence, the present invention enhances reliability on a corresponding control signal transmission.

And, frequency and/or time diversity can be obtained by carrying out FDMA and/or TDMA on the 1-bit control signal transmission side by side and by distributing to transmit a plurality of control signals for a specific UE on each time-frequency domain.

Moreover, in case of transmitting the 1-bit control signal through a plurality of time-frequency domains, by specifying to use an orthogonal code used for transmission in accordance with the size of the whole time-frequency domains instead of in the size of each time-frequency domain, it is able to increment a number of control signals that can be simultaneously transmitted.

Besides, in case that a plurality of OFDM symbols are used for 1-bit control signal transmission, by transmitting a CDMA modulated 1-bit control signal on a different OFDM symbol area through a different frequency domain, it is able to perform efficient transmission in aspects of resource efficiency and diversity gain. And, it is also able to make a power allocation more flexible within each OFDM symbol area.

Accordingly, a control information transmitting method according to the present invention has a configuration suitable to be applied to 3GPP LTE system. Moreover, a control information transmitting method according to the present invention is applicable to random communication systems that require specifications for a control information transmission format in time-frequency domain as well as to the 3GPP LTE system.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for a base station to transmit acknowledgement/non-acknowledgment (ACK/NACK) information, the method comprising:
   multiplexing, by the base station, multiple ACK/NACKs using different orthogonal codes into an ACK/NACK group; and
   transmitting, by the base station, the ACK/NACK group through each of a fixed number of multiple resource sets in a subframe that includes a plurality of orthogonal frequency division multiplexing (OFDM) symbols, each resource set of the fixed number of multiple resource sets including a predetermined number of closest available subcarriers and one OFDM symbol of the plurality of OFDM symbols,
   wherein the fixed number of multiple resource sets are separated along a frequency axis,
   wherein, when only a single OFDM symbol is used for ACK/NACK transmission in the subframe, the fixed number of multiple resource sets that are separated along the frequency axis are in the single OFDM symbol,
   wherein, when two OFDM symbols are used for ACK/NACK transmission in the subframe, the fixed number of multiple resource sets that are separated along the frequency axis are distributed across the two OFDM symbols alternately,
   wherein a total number of the multiple resource sets used when only the single OFDM symbol is used for ACK/NACK transmission is equal to a total number of the multiple resource sets used when the two OFDM symbols are used for ACK/NACK transmission, and
   wherein the multiple ACK/NACKs within the ACK/NACK group are distinguished from each other by the different orthogonal codes.

2. The method of claim 1, wherein the fixed number of multiple resource sets are separated such that the fixed number of multiple resource sets are distanced as far as possible from each other along the frequency axis.

3. The method of claim 1, wherein the multiple ACK/NACKs are multiplexed by further using phase components orthogonal to each other.

4. The method of claim 3, wherein the multiple ACK/NACKs within the ACK/NACK group are further distinguished by the phase components used for the multiple ACK/NACKs.

5. The method of claim 3, wherein a maximum number of the multiple ACK/NACKs that are transmitted using the fixed number of multiple resource sets is a double of the predetermined number of closest available subcarriers included in each of the fixed number of multiple resource sets.

6. The method of claim 1, wherein each of the different orthogonal codes has a length of '4', each of the fixed number of multiple resource sets includes '4' subcarriers, and a maximum number of the multiple ACK/NACKs being multiplexed in the ACK/NACK group is a double of '4'.

7. The method of claim 6, wherein the multiple ACK/NACKs are multiplexed by further using phase components orthogonal to each other and the multiple ACK/NACKs within the ACK/NACK group are further distinguished by the phase components used for the multiple ACK/NACKs.

8. The method of claim 1, wherein, when the two OFDM symbols are used for ACK/NACK transmission in the subframe, the fixed number of multiple resource sets that are separated along the frequency axis are distributed across the two OFDM symbols alternately, such that a first resource set of the fixed number of multiple resource sets is in a first OFDM symbol at a first frequency location along the frequency axis, a second resource set of the fixed number of multiple resource sets is in the second OFDM symbol at a second frequency location along the frequency axis that follows the first frequency location, a third resource set of the fixed number of multiple resource sets is in the first OFDM symbol at a third frequency location along the frequency axis that follows the second frequency location.

9. A method for a user equipment (UE) to receive acknowledgement/non-acknowledgment (ACK/NACK) signals from a base station through downlink radio resources, the method comprising:
   receiving, by the UE, an ACK/NACK group through each of a fixed number of multiple resource sets in a subframe that includes a plurality of orthogonal frequency division multiplexing (OFDM) symbols, each resource set of the fixed number of multiple resource sets including a predetermined number of closest available subcarriers and one OFDM symbol of the plurality of OFDM symbols; and
   demultiplexing, by the UE, the ACK/NACK group into multiple ACK/NACKs using different orthogonal codes,
   wherein the fixed number of multiple resource sets are separated along a frequency axis,
   wherein, when only a single OFDM symbol is used for ACK/NACK transmission in the subframe, the fixed number of multiple resource sets that are separated along the frequency axis are in the single OFDM symbol, wherein, when two OFDM symbols are used for ACK/NACK transmission in the subframe, the fixed number of multiple resource sets that are separated along the frequency axis are distributed across the two OFDM symbols alternately, wherein a total number of the multiple resource sets used when only the single OFDM symbol is used for ACK/NACK transmission is equal to a total number of the multiple resource sets used when the two OFDM symbols are used for ACK/NACK transmission, and wherein the multiple ACK/NACKs within the ACK/NACK group are distinguished from each other by the different orthogonal codes.

10. The method of claim 9, wherein the fixed number of multiple resource sets are separated such that the fixed number of multiple resource sets are distanced as far as possible from each other along the frequency axis.

11. The method of claim 9, wherein the multiple ACK/NACKs are multiplexed by further using phase components orthogonal to each other.

12. The method of claim 11, wherein a maximum number of the multiple ACK/NACKs that are transmitted using the fixed number of multiple resource sets is a double of the predetermined number of closest available subcarriers included in each of the fixed number of multiple resource sets.

13. The method of claim 9, wherein each of the different orthogonal codes has a length of '4', each of the fixed number of multiple resource sets includes '4' subcarriers, and a maximum number of the multiple ACK/NACKs being multiplexed in the ACK/NACK group is a double of '4'.

14. The method of claim 9, wherein, when the two OFDM symbols are used for ACK/NACK transmission in the subframe, the fixed number of multiple resource sets that are separated along the frequency axis are distributed across the two OFDM symbols alternately, such that a first resource set of the fixed number of multiple resource sets is in a first OFDM symbol at a first frequency location along the frequency axis, a second resource set of the fixed number of multiple resource sets is in the second OFDM symbol at a second frequency location along the frequency axis that follows the first frequency location, a third resource set of the fixed number of multiple resource sets is in the first OFDM symbol at a third frequency location along the frequency axis that follows the second frequency location.

* * * * *